United States Patent
Turner et al.

(10) Patent No.: US 7,204,880 B1
(45) Date of Patent: Apr. 17, 2007

(54) RAPID SETTING CEMENT

(76) Inventors: Terry A. Turner, P.O. Box 24, Madras, OR (US) 97741; Philip A. Rodda, 1520 N. Hwy. 97, Redmond, OR (US) 97756

( * ) Notice: Subject to any disclaimer, the term of this patent is extended or adjusted under 35 U.S.C. 154(b) by 0 days.

(21) Appl. No.: 11/054,322

(22) Filed: Feb. 8, 2005

Related U.S. Application Data

(60) Provisional application No. 60/574,006, filed on May 21, 2004.

(51) Int. Cl.
- *C04B 12/02* (2006.01)
- *C04B 9/04* (2006.01)
- *C04B 28/34* (2006.01)

(52) U.S. Cl. .................... 106/691; 106/690; 106/705

(58) Field of Classification Search ........... 106/690, 106/691, 705
See application file for complete search history.

(56) References Cited

U.S. PATENT DOCUMENTS

| | | | | |
|---|---|---|---|---|
| 3,960,580 A | * | 6/1976 | Stierli et al. | 501/111 |
| 4,423,764 A | * | 1/1984 | Seeney et al. | 164/528 |
| 6,136,088 A | * | 10/2000 | Farrington | 106/691 |
| 6,458,423 B1 | * | 10/2002 | Goodson | 427/403 |
| 6,783,799 B1 | * | 8/2004 | Goodson | 427/140 |
| 2002/0009622 A1 | * | 1/2002 | Goodson | 428/703 |
| 2003/0127025 A1 | * | 7/2003 | Orange et al. | 106/690 |
| 2003/0131759 A1 | * | 7/2003 | Francis et al. | 106/286.1 |
| 2004/0194657 A1 | * | 10/2004 | Lally | 106/18.12 |

* cited by examiner

*Primary Examiner*—Anthony J. Green
(74) *Attorney, Agent, or Firm*—Kolisch Hartwell, P.C.

(57) ABSTRACT

A cement formula including mono potassium phosphate, mono ammonium phosphate, magnesia, and fly ash exhibits rapid setting and high strength characteristics.

8 Claims, No Drawings

RAPID SETTING CEMENT

CROSS REFERENCE TO RELATED APPLICATION

This application claims priority under 35 U.S.C. § 119 and applicable foreign and international law and incorporates in their entirety the following U.S. Provisional Patent Application Ser. No. 60/574,006 filed May 21, 2004.

This application also incorporates by reference in their entireties and for all purposes, the following U.S. patents: U.S. Pat. Nos. 3,285,758; 3,357,843; 3,879,209; 3,960,580; 4,059,455; 4,152,167; 4,394,174; 4,786,328; 4,836,854; 5,645,518; 5,830,815; 5,846,894; 6,133,498; 6,136,088; 6,153,809; 6,204,214; 6,518,212; and 6,569,263.

FIELD OF THE INVENTION

The invention relates to cement, particularly cement that develops strength rapidly for patching or repairing cementitious surfaces or structures.

BACKGROUND OF THE INVENTION

There are many situations which require cement structure to be repaired. Most notably, roadways frequently wear and degrade resulting in holes, cracks, etc.

One problem with some cement repair formulas is that they take too long to develop sufficient strength to permit resumed use of the cement structure. This can be a major problem if the cement structure is, for example, a heavily traveled road.

Rapid setting formulas have been used in the past. However, these formulas suffer from a variety of problems. For example, rapid setting cement formulas sometimes use ammonium phosphate which produces noxious ammonia gas when mixed.

Some cement formulas set too fast, allowing insufficient time to work the material into the desired location and form.

DESCRIPTION

Improved cement formulations provide modern, all season, repair and anchoring materials in a single component, inorganic, high performance cement. Exemplary cement formulas adhere to concrete, masonry, metal, asphalt, and to itself, without the need of a bonding agent and may be used both inside and outside and in hot and cold temperatures.

The described formulas have been formulated for repair and anchoring of work that requires exceptional bonding, adhesion and strength. The formulas have been designed for jobs where availability of working time for the repair is limited or "down time" must be minimized.

A preferred formulation is shown below:

| Neat Cement Formula: | |
|---|---|
| Hardburnt, high purity Magnesia (MgO) | 30.0% |
| Anhydrous Mono Potassium Phosphate | 24.0% |
| Mono Ammonium Phosphate | 6.0% |
| Fly Ash F | 40.4% |
| | 100% |

| Blended Cement ready to use: | |
|---|---|
| Hardburnt, high purity Magnesia (MgO) | 12.4% |
| Anhydrous Mono Potassium Phosphate | 10.0% |
| Mono Ammonium Phosphate | 2.5% |
| Fly Ash F | 16.5% |
| Silica Sand 16 mesh | 29.3% |
| Silica Sand 30 mesh | 29.3% |
| | 100% |

The total phosphate, including mono potassium phosphate (MKP) and mono ammonium phosphate (MAP), may be selected in the approximate range of 10% to 45% (w/w) of the total neat formula (excluding sand and water). For some applications the total phosphate amount should be in the range of 25% to 35% of the total neat formula.

The total phosphate component may be a mixture of MKP and MAP. MAP is important for increasing the reaction speed, providing faster setting and strength development. However, the MAP component should be minimized to avoid noxious ammonia odors. Preferably the MAP component is selected from the approximate range of 2% to 20% of the total neat formula. For some applications the MAP component should be in the range of 2% to 10%.

The following factors may affect the formulation. A formula incorporating MKP without MAP may be too slow to set (up to 45 minutes); and may show slow strength gain and low ultimate strength and low exotherm. Low amounts of MAP in addition to MKP showed surprising large gains in set speed and rapid strength development. High amounts of MAP, however, may cause the cement to set too fast and may produce an objectionable ammonia odor.

Another factor is the cost of MKP, which is much higher than MAP. This may influence the amount of MKP used. With MKP it is possible to use lower %'s of a higher purity MgO, the next most costly ingredient, and we can use higher amounts of FAF, the least costly ingredient. Also, since FAF is considered a waste material, using higher %'s contributes to the "green" (environmental) nature of the cement.

Advantages of improved cement formula, known as "Tectonite™ Cement" follow. Tectonite™ Cement allows the user sufficient working time (approximately 15 minutes at 72 F) without compromising high early strength development (approximately 3,000 psi in 30 minutes and 4,000 psi in 60 minutes). Tectonite™ Cement has a uniform color that cures closely to the color of Portland cement concrete. Tectonite™ Cement is smooth in texture in order to allow feathering in cosmetic repairs, while maintaining strength in structural repairs (minimum ¼" thickness). Tectonite™ Cement requires less water than prior formulas. It is recommended that a ratio of 6 parts cement to 1 part water be used. The water cement mixture should be barely pourable. Water in excess of the recommended amount will weaken the cement's ultimate strength.

In cold weather applications it is recommended that for best results the repair area should be warmed as well as using warm mixing water.

Characteristics

High Strength—Tectonite™ achieves, in around a half an hour, compressive strengths attained by ordinary Portland cement in 28 days.

Fast Set—Tectonite™ sets in about 15 minutes (at 72 F) from the time of hydration and is traffic ready in about thirty minutes.

Tenacious Bond—Tectonite™ achieves, at a fraction of the cost of complicated epoxy cements, a chemical bond with materials to which it is applied.

Some Recommended Uses

---

High Traffic Areas

Roadways - Concrete & Asphalt (Easy color matching)
Potholes, Curbs, Sidewalks, Culverts, Pits, and Truck Docks
Bridges, Irrigation Structures, Tanks & Dams
Walls, Seawalls, Runways, Aprons & Parking Structures
Steps, Floors & Corridors
Spillways & Platforms Subject to High/Low Temperatures
Irregular Repairs -
Fast set often allows for hand held forms.

Broken Corners
Chipped Steps & Abutments
Cracked and Spalled Areas
Free Form Contour Repair
Concave/Convex Surfaces
Difficult Verticals & Angles
Anchoring & Re-Anchoring Iron & Steel Anchoring
Easy Cleanup
Competitive with fast epoxies, less expensive
Guy Wires - Poles & Posts
Signs - Parking Meters
Bolts - Frames & Rails
Hand rails
Machinery Bases

---

Tectonite™ is fast setting. In hot weather, cold components will retard set time. In cold weather, warm components will accelerate set time. In normal temperatures (70–75 F), allow no more than 15 minutes for hydrating, mixing, placing, and finishing. Add only enough water to create a thick, barely pourable, mixture in accordance with recommendations. Prior to mixing large volumes, mix a cup-sized quantity to get a "feel" for consistency and set time. Store in a dry place. Moisture and/or high humidity will affect performance and reduce the one-year shelf life.

Area(s) to be repaired must be clean. Remove standing water. For best results, product should not be used for patches less than ¼ inch deep; for deep repairs, ⅜ inch non-calcareous aggregate at rate of 20–25 lbs. per 60 lbs. of cement may be added. Apply in multiple layers, allowing cement to cool between pours. In warm weather (80–110 F.°), cool repair area with cold water; in cold weather (30–45 F.°), heat repair area until warm to the touch. No moist cure is required. Air cure and protect from inclement weather until final set.

Mixing Ratios

It is recommended that a ratio of 6 parts cement to 1 part water be used, in order to produce a mix that is just barely pourable. Water in excess of the recommended amount may weaken the cement's ultimate strength.

Performance Data

---

| | |
|---|---|
| ASTM C 109-93 Compressive Strength PSI. 30 Minutes/1 Hour/28 days | 2,787 PSI (19.2)/4,025 PSI (27.8)/ 6,500 PSI (44.8) |
| ASTM C 157, ASTM C 928-92a Length Change 28 Day Dry, 28 Day Wet | −0.002%, −0.007% |
| ASTM C 78-84 Flexural Strength 1 Hour, 1 Day, 28 Days | 576 PSI (4.0), 626 PSI (4.3), 760 PSI (5.2) |
| ASTM C 882-87 Bond Strength with Portland Cement | |
| 1 Day-Portland Cement Failed, Bond Held | 2,000 PSI (13.8) |
| 7 Day-Portland Cement Failed, Bond Held | 2,213 PSI (15.3) |
| ASTM 666-90 Freeze/Thaw Resistance 300 cycles | Freeze-thaw durable |

( ) = MPa

---

Section I - Material Identification

| | |
|---|---|
| Trade/Material Name: | Tectonite ™ (SF) Cement |
| Description: | Magnesium Oxyphosphate Cement |
| Other Designations: | Magnesium Oxide (Mag-Ox) |
| CAS: | None assigned |
| Chemical Name: | Magnesium Oxyphosphate Cement |
| Manufacturer: | Tectonics International, per above |

Section II - Ingredients and Hazards

| Ingredient Name | CAS Number | Percent | Exposure Limits (Respirable Dust OHSA PEL) |
|---|---|---|---|
| Dead burned magnesite | 1309-48-4 | 25–40 | 10 mg/m$^3$ |
| Nitrogen | 10101-89-0 | 5–12 | 5 mg/m$^3$ |
| Phosphate (AS P205) | 7722-78-1 | 10–15 | 1 mg/m$^3$ |
| Phosphate (AS H$_3$PO$_4$) | 7722-78-1 | 10–15 | 1 mg/m$^3$ |
| Crystalline Quartz | 14808-60-1 | 50–75 | .01 mg/m$^3$ |
| Fly Ash | 68131-74-8 | 10–50 | 5 mg/m$^3$ |

This material contains less than 1% free silica. The respirable dust Permissible Exposure Limit ("PEL") for this material would be: 3.3 mg/M$^3$ for total dust and 5 mg/M$^3$ for respirable dust.

Section III - Physical Data

| | |
|---|---|
| Appearance & Odor | Granular Gray powder - no odor |
| Boiling Point & Evaporation Rate | N/A |
| Vapor Pressure | N/A |
| Specific Gravity, H$_2$O = 1 | 3.20–3.40 |
| Water Solubility (%) | Nil |
| Vapor Density, air = 1 | N/A |
| Melting Point | >2,200° F. |
| % Volatile by Volume | 0 |

EXPERIMENT

Comparison of new formula vs. old formula ("neat") exotherms: (Note: Neat cement with sand will show a little slower set time and lower exotherm.)

The cement formulas that were compared are shown below:

| Old Formula | |
|---|---|
| | % |
| MC-92 PV MgO | 57 |
| Agrium 11-52-0 MAP | 26 |
| Pozzolanic NW FAF | 17 |
| | 100% |

| New Formula | |
|---|---|
| | % |
| BayMag 96 SR MgO | 30 |
| Rotem 0-52-34 MKP | 25 |
| Agrium 11-52-0 MAP | 5 |
| Pozzolanic NW FAF | 40 |
| | 100% |

| Old Formula | |
|---|---|
| Time | Temp. |
| 0 | 71 F. |
| 1 min. | 71 F. |
| 2 | 74 F. |
| 3 | 78 F. |
| 4 | 83 F. |
| 5 | 88 F. |
| 5.5 | 90 F. Set |
| 6 | 94 F. |
| 7 | 113 F. |
| 8 | 122 F. |
| 9 | 211 F. Max |

| New Formula | |
|---|---|
| Time | Temp. |
| 0 | 71 F. |
| 1 min. | 71 F. |
| 2 | 71 F. |
| 3 | 74 F. |
| 4 | 76 F. |
| 5 | 79 F. |
| 6 | 83 F. |
| 7 | 86 F. |
| 8 | 92 F. |
| 9 | 100 F. |
| 10 | 114 F. |
| 11 | 123 F. Set |
| 12 | 135 F. |
| 13 | 143 F. |
| 14 | 154 F. |
| 15 | 163 F. |
| 16 | 173 F. |
| 17 | 174 F. Max |

The specific embodiments disclosed and illustrated herein should not be considered as limiting the scope of the invention, as understood by a person having ordinary skill in the art. Numerous variations are possible without falling outside the scope of the appended claims. The subject matter of the invention includes all novel and nonobvious combinations and subcombinations of the various elements, features, functions, and/or properties disclosed herein.

We claim:

1. A composition for making cement comprising MgO being approximately 15% to 45% of the total weight of the composition, monoammonium phosphate being approximately 2% to 20% of the total weight of the composition, monopotassium phosphate, the monoammonium phosphate plus monopotassium phosphate together being approximately 10% to 45% of the total weight of the composition, and fly ash being approximately 25% to 55% of the total weight of the composition.

2. The composition of claim 1, further comprising sand.

3. The composition of claim 2, wherein the weight of sand is in the range of 45% to 75% of the total composition weight.

4. The composition of claim 1, wherein the MgO is hardburnt high purity.

5. The composition of claim 1, wherein the MgO is about 30% of the total weight of the composition.

6. The composition of claim 1, wherein the monoammonium phosphate is about 24% of the total weight of the composition.

7. The composition of claim 1, wherein the monopotassium phosphate is about 24% of the total weight of the composition.

8. The composition of claim 1, wherein the fly ash is about 40% of the total weight of the composition.

* * * * *